(12) United States Patent
Madsen et al.

(10) Patent No.: US 11,858,073 B2
(45) Date of Patent: *Jan. 2, 2024

(54) SYSTEMS AND METHODS FOR EFFICIENT PROVISION OF ARC WELDING POWER SOURCE

(71) Applicant: Illinois Tool Works Inc., Glenview, IL (US)

(72) Inventors: Michael David Madsen, Fremont, WI (US); Quinn William Schartner, Kaukauna, WI (US)

(73) Assignee: Illinois Tool Works Inc., Glenview, IL (US)

( * ) Notice: Subject to any disclaimer, the term of this patent is extended or adjusted under 35 U.S.C. 154(b) by 303 days.

This patent is subject to a terminal disclaimer.

(21) Appl. No.: 16/781,566

(22) Filed: Feb. 4, 2020

(65) Prior Publication Data

US 2020/0171594 A1 Jun. 4, 2020

Related U.S. Application Data

(60) Continuation of application No. 15/095,952, filed on Apr. 11, 2016, now Pat. No. 10,549,373, which is a
(Continued)

(51) Int. Cl.
*B23K 9/10* (2006.01)
*H02M 7/5387* (2007.01)
*B23K 9/095* (2006.01)

(52) U.S. Cl.
CPC ............ *B23K 9/1043* (2013.01); *B23K 9/095* (2013.01); *B23K 9/1012* (2013.01); *H02M 7/5387* (2013.01)

(58) Field of Classification Search
CPC .... B23K 9/1043; B23K 9/1012; B23K 9/095; H02M 7/5387
(Continued)

(56) References Cited

U.S. PATENT DOCUMENTS 3,689,734 A 9/1972 Burley et al.
3,689,737 A 9/1972 Eckles
(Continued)

FOREIGN PATENT DOCUMENTS

EP 0319669 6/1989
EP 0970775 1/2000
(Continued)

OTHER PUBLICATIONS

International Search Report for application No. PCT/US2010/034500 dated Aug. 27, 2010.
(Continued)

*Primary Examiner* — Thien S Tran
(74) *Attorney, Agent, or Firm* — McAndrews, Held & Malloy, Ltd.

(57) ABSTRACT

Methods and systems for creating and controlling an AC output for welding, plasma cutting or heating are provided. One embodiment of the present disclosure achieves a desired square wave AC output and reduces the number of circuit components needed by combining components of a buck converter and a full bridge inverter. Current flow paths through a power control circuit that are generated via switching of transistors in the circuit on and off are provided. In one embodiment, a pulse width modulation leg, which controls the level of current flow through an inductor, is provided. Certain embodiments include a bidirectional buck converter that converts an unregulated DC flow to a regulated DC flow through an inductor. In one embodiment, a steering leg is provided, which controls a direction of current flow through the inductor. Additionally, an output clamp circuit, which suppresses the parasitic load inductance during polarity reversal is provided.

20 Claims, 8 Drawing Sheets

Related U.S. Application Data continuation of application No. 14/100,832, filed on Dec. 9, 2013, now Pat. No. 9,308,598, which is a division of application No. 12/486,920, filed on Jun. 18, 2009, now Pat. No. 8,604,384.

(58) Field of Classification Search
USPC .............................. 219/69.13, 69.18, 137 PS
See application file for complete search history.

(56) References Cited

U.S. PATENT DOCUMENTS

| | | | |
|---|---|---|---|
| 4,359,622 A | 11/1982 | Dostoomian | |
| 4,384,188 A | 5/1983 | Wright | |
| 4,438,317 A | 3/1984 | Ueguri | |
| 4,485,293 A | 11/1984 | Tabata | |
| 4,521,671 A | 6/1985 | Fronius | |
| 4,544,826 A | 10/1985 | Nakanishi | |
| 4,742,208 A * | 5/1988 | Overman | H02M 7/53871 |
| | | | 219/130.1 |
| 4,749,935 A | 6/1988 | Osborne | |
| 4,794,232 A | 12/1988 | Kimbrough | |
| 4,866,247 A | 9/1989 | Parks | |
| 4,876,433 A * | 10/1989 | Kashima | B23K 9/1056 |
| | | | 219/130.51 |
| 4,894,598 A | 1/1990 | Daggett | |
| 4,947,021 A * | 8/1990 | Stava | B23K 9/091 |
| | | | 219/130.51 |
| 5,059,766 A | 10/1991 | Gilliland | |
| 5,196,668 A | 3/1993 | Kobayashi | |
| 5,278,390 A | 1/1994 | Blankenship | |
| 5,315,533 A | 5/1994 | Stich | |
| 5,357,078 A | 10/1994 | Smith | |
| 5,591,355 A | 1/1997 | Ishikawa | |
| 5,600,550 A | 2/1997 | Cookll | |
| 5,864,116 A | 1/1999 | Baker | |
| 5,991,169 A | 11/1999 | Kooken | |
| 6,015,964 A | 1/2000 | Baker | |
| 6,111,216 A | 8/2000 | Stava | |
| 6,115,273 A | 9/2000 | Geissler | |
| 6,160,241 A | 12/2000 | Stava | |
| 6,160,722 A | 12/2000 | Thommes | |
| 6,172,888 B1 | 1/2001 | Jochi | |
| 6,225,598 B1 | 5/2001 | Nihei | |
| 6,278,357 B1 | 8/2001 | Croushore | |
| 6,321,139 B1 | 11/2001 | Terada | |
| 6,321,167 B1 | 11/2001 | Jochi | |
| 6,359,258 B1 | 3/2002 | Blankenship | |
| 6,365,874 B1 | 4/2002 | Stava | |
| 6,596,970 B2 | 7/2003 | Blankenship | |
| 6,649,869 B2 | 11/2003 | Reynolds | |
| 6,710,297 B1 | 3/2004 | Artelsmair | |
| 6,717,108 B2 | 4/2004 | Hsu | |
| 6,735,537 B2 | 5/2004 | Liu | |
| 6,930,279 B2 | 8/2005 | Myers | |
| 7,049,545 B2 | 5/2006 | Matus | |
| 7,064,290 B2 | 6/2006 | Blankenship | |
| 7,091,445 B2 | 8/2006 | Myers | |
| 7,105,772 B2 | 9/2006 | Houston | |
| 7,141,759 B2 | 11/2006 | Mela | |
| 7,173,214 B2 | 2/2007 | Nadzam | |
| 7,173,393 B2 | 2/2007 | Maeda | |
| 7,183,517 B2 | 2/2007 | Albrecht | |
| 7,301,308 B2 | 11/2007 | Aker | |
| 7,952,310 B2 | 5/2011 | Hamasaki | |
| 8,049,140 B2 | 11/2011 | Kawamoto | |
| 8,199,536 B2 | 6/2012 | Mangraviti | |
| 8,225,598 B2 | 7/2012 | Haeberer | |
| 8,269,141 B2 | 9/2012 | Daniel | |
| 8,278,882 B2 | 10/2012 | Gotou | |
| 8,410,398 B2 | 4/2013 | Daniel | |
| 3,456,726 A1 | 6/2013 | Watanabe | |
| 8,455,794 B2 | 6/2013 | Vogel | |
| 8,525,077 B2 | 9/2013 | Peters | |
| 8,546,726 B2 | 10/2013 | Vogel | |
| 8,581,147 B2 | 11/2013 | Kooken | |
| 8,637,786 B2 | 1/2014 | Salsich | |
| 8,653,413 B2 | 2/2014 | Vogel | |
| 8,785,816 B2 | 7/2014 | Kooken | |
| 8,884,188 B2 | 11/2014 | Vogel | |
| 8,952,293 B2 | 2/2015 | Vogel | |
| 9,018,802 B2 | 4/2015 | Sun | |
| 9,144,856 B2 | 9/2015 | Vogel | |
| 9,492,880 B2 | 11/2016 | Vogel | |
| 2005/0057210 A1 | 3/2005 | Mitsuo | |
| 2006/0049163 A1 | 3/2006 | Gotoh | |
| 2006/0054610 A1 | 3/2006 | Morimoto | |
| 2006/0175313 A1 | 8/2006 | Kooken | |
| 2006/0226130 A1 | 10/2006 | Kooken | |
| 2006/0243716 A1 | 11/2006 | Stava | |
| 2007/0030612 A1 | 2/2007 | Kamath | |
| 2007/0181547 A1 | 8/2007 | Vogel | |
| 2007/0187376 A1 | 8/2007 | Albrecht | |
| 2007/0215585 A1 | 9/2007 | OConnor | |
| 2008/0078812 A1 | 4/2008 | Peters | |
| 2008/0296276 A1 | 12/2008 | Schartner | |
| 2009/0039063 A1 | 2/2009 | Madsen | |
| 2009/0230941 A1 | 9/2009 | Vogel | |
| 2010/0170880 A1 | 7/2010 | Hsu | |
| 2010/0320182 A1 | 12/2010 | Madsen | |
| 2011/0108536 A1 | 5/2011 | Inada | |
| 2011/0220630 A1 | 9/2011 | Speilman | |
| 2012/0000895 A1 | 1/2012 | Sato | |
| 2014/0374397 A1 | 12/2014 | Vogel | |

FOREIGN PATENT DOCUMENTS

| | | | |
|---|---|---|---|
| EP | 1138429 | 10/2001 | |
| EP | 1671737 | 6/2006 | |
| EP | 1671737 A2 * | 6/2006 | ............... B23K 9/20 |
| FR | 2850463 | 7/2004 | |
| GB | 2393338 | 3/2004 | |
| JP | S61273260 | 12/1986 | |
| JP | 2001276971 | 10/2001 | |
| WO | 2008140398 | 1/2008 | |

OTHER PUBLICATIONS

International Search Report from PCT application No. PCT/US2016/068401, dated Apr. 13, 2017, 11 pgs.

Canadian Office Action Appln. No. 3,006,592 dated Mar. 26, 2019.

* cited by examiner

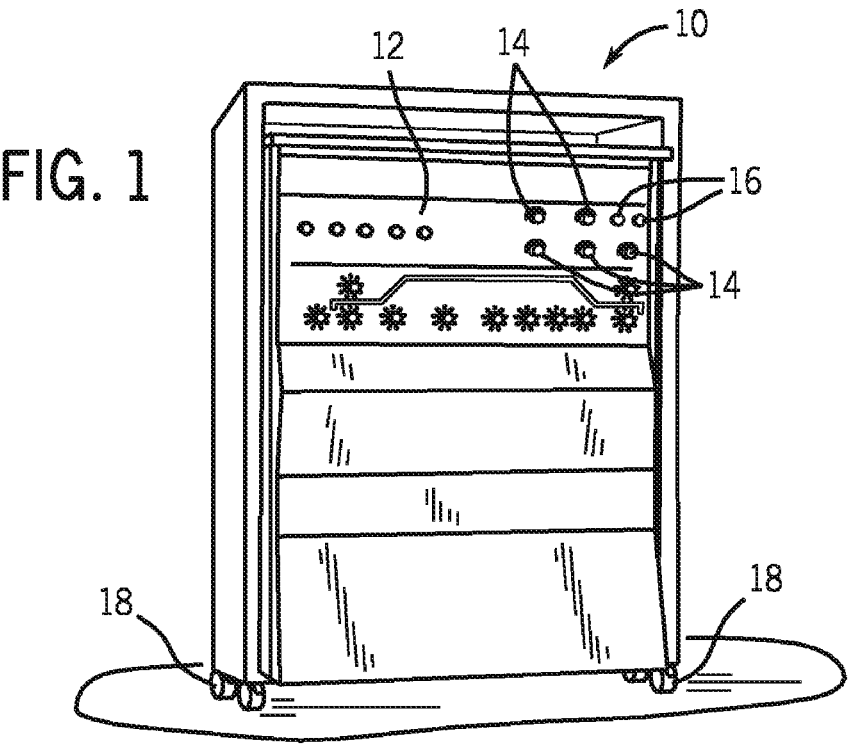
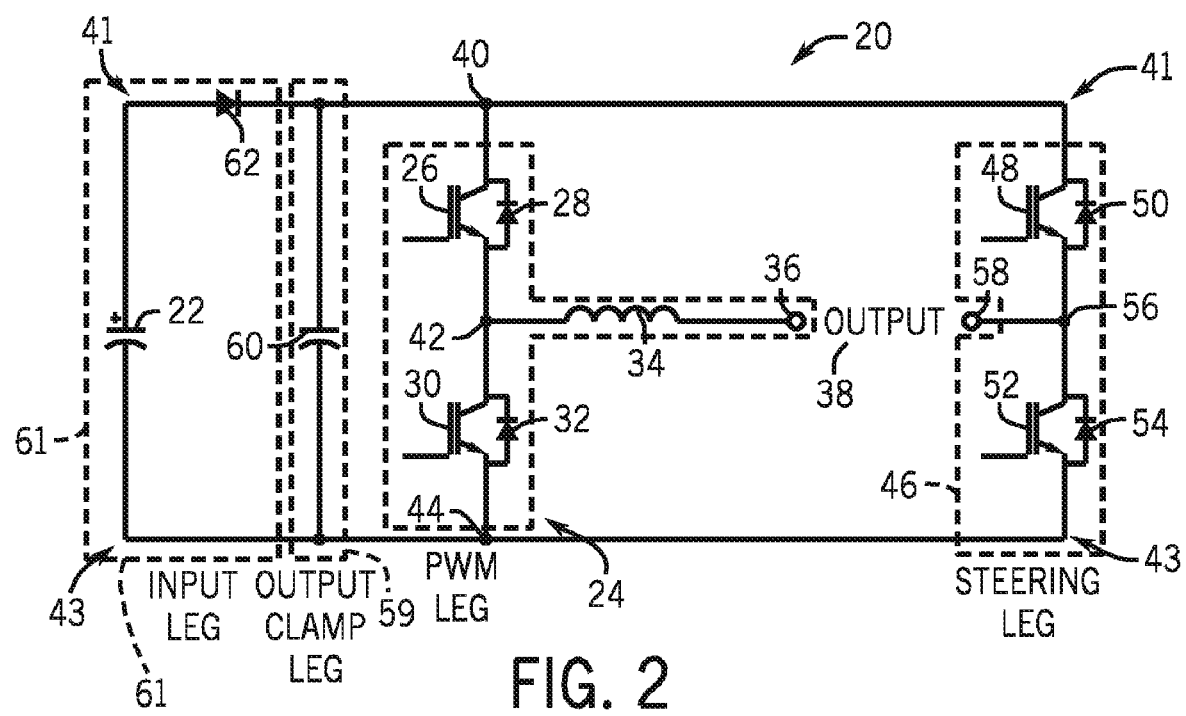

SYSTEMS AND METHODS FOR EFFICIENT PROVISION OF ARC WELDING POWER SOURCE

CROSS-REFERENCE TO RELATED APPLICATIONS

The present application is a continuation of and claims priority to U.S. patent application Ser. No. 15/095,952, filed on Apr. 11, 2016, and entitled "Systems and Methods for Efficient Provision of Arc Welding Power Source" in the name of Michael David Madsen et al., which is a continuation of U.S. patent application Ser. No. 14/100,832, filed Dec. 9, 2013, entitled "System and Methods for Efficient Provision of Arc Welding Power Source" in the name of Michael David Madsen et al., which issued as U.S. Pat. No. 9,308,598 on Apr. 12, 2016, which is a divisional of U.S. patent application Ser. No. 12/486,920, filed Jun. 18, 2009, entitled "System and Methods for Efficient Provision of Arc Welding Power Source" in the name of Michael David Madsen et al., which issued as U.S. Pat. No. 8,604,384 on Dec. 10, 2013, all of which are incorporated herein by reference.

BACKGROUND

The present disclosure relates generally to welding power supplies, and more particularly, to systems and methods for controlling current flow through an output load of a power control circuit.

Welding power supply circuits typically convert power from a primary source to an output suitable for welding operations. The output power is provided at an appropriate voltage or current level and may be controlled and regulated according to the process requirements. Some welding processes require the output to be AC. For instance, typical high current AC outputs for gas tungsten arc welding (GTAW) or submerged arc welding (SAW) may require circuitry that efficiently generates a square wave output with a magnitude of several hundreds of amperes. Typical circuit topologies designed to meet this need include a buck converter that steps down a supplied DC voltage, a full bridge inverter that converts the stepped down DC voltage to an AC output, and an output clamp circuit that suppresses output energy caused by parasitic output inductance from welding cables during output current reversal.

Since welding operations generally require high current levels and low voltage levels at the output, an important design criterion of typical welding and plasma cutting power supply circuits is the limitation of power losses in the circuit. However, it is now recognized that traditional power supply circuits include a combination of components (e.g., buck converter, full bridge inverter, and output clamp circuit) that typically contain multiple transistors and diodes, which greatly contribute to power losses in the circuit, leading to inefficiencies in the circuit design. Indeed, it is now recognized that there exists a need for circuits that reduce the power losses in the circuit and increase the efficiency of the welding power supply.

BRIEF DESCRIPTION

The present disclosure is directed to systems and methods relating to a power control circuit. One embodiment of the present disclosure efficiently achieves a desired square wave AC output by combining components of a buck converter and a full bridge inverter in a unique manner. In particular, the present disclosure provides methods and systems for creating and controlling an AC output for welding, plasma cutting or heating. For example, one embodiment of the present disclosure provides a power control circuit and current flow paths through the power control circuit that are generated via switching of transistors in the circuit on and off. Specifically, in one embodiment, the power control circuit includes a pulse width modulation leg, which controls the level of current flow through an inductor. Additionally, the power control circuit may include a bidirectional buck converter that converts an unregulated DC flow from a source to a regulated DC flow through the inductor. Further, the power control circuit may include a steering leg, which controls a direction of current flow through the inductor. In some embodiments, an output clamp circuit of the power control circuit may function to suppress the parasitic load inductance during polarity reversal. In other embodiments, if a voltage higher than the input voltage is not required to maintain the arc current during polarity reversal, then the output clamp circuit may be removed and an input leg may be used to suppress the parasitic load inductance during polarity reversal.

DRAWINGS

These and other features, aspects, and advantages of the present disclosure will become better understood when the following detailed description is read with reference to the accompanying drawings, wherein:

FIG. 1 illustrates an exemplary welding, cutting or heating power supply in accordance with aspects of the present disclosure;

FIG. 2 is a circuit diagram illustrating an exemplary embodiment of the output power control circuit of the welding power supply in accordance with aspects of the present disclosure;

DETAILED DESCRIPTION

Figure 3:
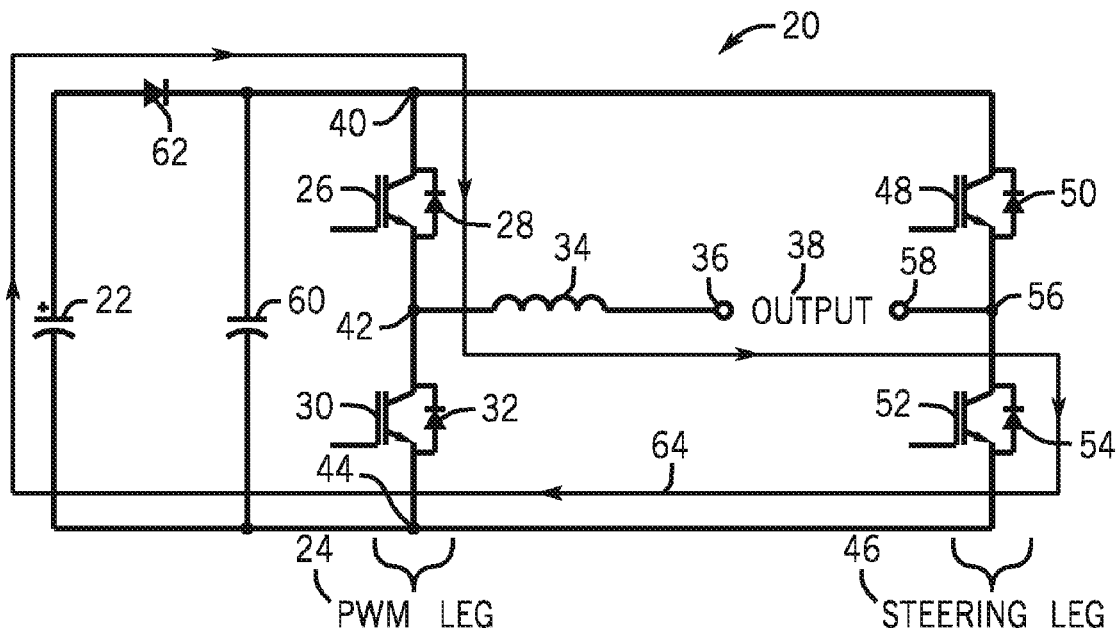
FIG. 3 is a circuit diagram illustrating an exemplary embodiment of the output power control circuit with current flow established from left to right through the output load in accordance with aspects of the present disclosure.

FIG. 1 illustrates an exemplary welding, cutting or heating power supply 10, which functions to power and control a welding, cutting or heating operation in accordance with aspects of the present disclosure. The power supply unit 10 in the illustrated embodiment contains a control panel 12 through which a user may control the supply of materials, such as power, gas flow, and so forth, to the welding, cutting or heating operation through knobs 14 or other panel components. The power supply 10 contains ports 16, which may communicatively couple the power supply 10 to other system components, such as a torch, a work lead, a wall power outlet, and so forth. The portability of the unit 10 depends on a set of wheels 18, which enable the user to easily move the power supply unit 10 to the location of a workpiece.

FIG. 2 is a circuit diagram illustrating one embodiment of an output power control circuit 20 of the welding power supply 10 in accordance with aspects of the present disclosure. The power control circuit 20 converts an unregulated DC input to a regulated AC output as needed for the welding, cutting or heating operation being performed. For instance, typical submerged arc welding (SAW) operations may require a regulated high current square wave output of several hundreds of amperes. However, primary power sources, such as a wall outlet, provide an unregulated AC output that is insufficient for a SAW operation. Therefore, it is now recognized that circuitry must convert the output of the primary power source to an output suitable for the welding, cutting or heating operation being performed. In operation, the power control circuit 20 illustrated in FIG. 2 efficiently converts unregulated DC inputs to a first capacitor 22 from the primary power supply to regulated AC outputs for the welding, cutting or heating operation. In the following discussion, the power control circuit 20 illustrated in FIG. 2 may be broken up into legs and sides for explanatory purposes. However, one skilled in the art would understand that the components of the circuit 20 may be arranged and/or grouped differently while retaining the overall function of the circuit 20.

A pulse width modulation (PWM) leg 24 modulates current received from the first capacitor 22 such that the received unregulated DC current is converted to a regulated DC current. The PWM leg 24 includes a first transistor 26 and a first diode 28 coupled in parallel, a second transistor 30 and a second diode 32 coupled in parallel, an inductor 34, and a first terminal 36 of an output 38. The first transistor 26 and the first diode 28 may be positioned in between a first node 40 and a second node 42. As illustrated in FIG. 2, the first node 40 may be located such that it is positioned on a first outer edge 41 of the circuit 20. The second node 42 is located below the first outer edge 41 of the circuit 20 but above a second outer edge 43 of the circuit 20. The second transistor 30 and the second diode 32 may be positioned in between the second node 42 and a third node 44, which may be located such that it is positioned on the second outer edge 43 of the circuit 20. The inductor 34 may be positioned in between the second node 42 and the first terminal 36 of the output 38 and parallel to the first outer edge 41 and the second outer edge 43 of the circuit 20.

The PWM leg 24 alternates switching of the first transistor 26 or the second transistor 30 to increase or decrease current at the output 38 as dictated by the demands of the welding or plasma cutting operation. In some embodiments, the first transistor 26, the second diode 32, and the inductor 34 may be configured to function as a buck converter. Similarly, in some embodiments, the second transistor 30, the first diode 28, and the inductor 34 may be configured to function as a buck converter, transferring energy from an input to an output by storing and subsequently releasing energy in the inductor 34. Taken together, the first transistor 26, the first diode 28, the second transistor 30, the second diode 32, and the inductor 34 may function as a bidirectional buck converter, which converts the DC voltage across the first capacitor 22 to a regulated DC current in the inductor 34.

A steering leg 46, which includes a third transistor 48 and a third diode 50 coupled in parallel and a fourth transistor 52 and a fourth diode 54 coupled in parallel, forms a half bridge inverter that determines the direction of current flow through the inductor 34. The steering leg 46 is positioned between the first outer edge 41 and the second outer edge 43 of the circuit 20. During operation, the steering leg 46 facilitates current flow either from right to left through the inductor 34 or from left to right through the inductor 34 by turning the third transistor 48 and the fourth transistor 52 on and off. The third transistor 48 and the third diode 50 may be positioned in between the first node 40 and a fourth node 56. The fourth transistor 52 and the fourth diode 54 may be positioned in between the fourth node 56 and the third node 44 such that they exist in series with the first node 40, which is positioned on the first outer edge 41 of the circuit 20, and the fourth node 56, which is positioned in between the first outer edge 41 of the circuit 20 and the second outer edge 43 of the circuit 20. A second terminal 58 of the output 38 extending from the fourth node 56 in parallel with the first outer edge 41 and the second outer edge 43 of the circuit 20 may be configured to receive current from the steering leg 46.

An output clamp leg 59 includes a second capacitor 60 that is configured to function as an output clamp circuit, which suppresses the energy in a parasitic output inductance of the welding or cutting cables during polarity reversal. The output clamp leg 59 is positioned between and connects the first outer edge 41 and the second outer edge 43 of the circuit 20. In some embodiments, the capacity of the second capacitor 60 is much less than the capacity of the first capacitor 22. In some embodiments, the peak current in the second capacitor 60 during polarity reversal may be the current in the inductor 34 and the parasitic output inductance of the welding or cutting cables.

An input leg 61 includes the first capacitor 22 and a blocking diode 62 arranged in series. As illustrated in FIG. 2, the blocking diode 62 may be positioned on the first outer edge 41 of the circuit 20 and the first capacitor 22 may be positioned in between the first outer edge 41 and the second outer edge 43 of the circuit 20. The input leg 61 is positioned between the first outer edge 41 and the second outer edge 43 of the circuit 20. The first capacitor 22 is configured to receive power from a primary power source that may include a line frequency step down transformer and a rectifier. The transformer may be single phase or three phase and may output 50 Hz or 60 Hz. The transformer may have multiple primary taps to accommodate multiple input voltages. The blocking diode 62 allows the second capacitor 60 to resonate with the series combination of the inductor 34 and the parasitic output inductance during polarity reversal as described in more detail below.

Figure 4:
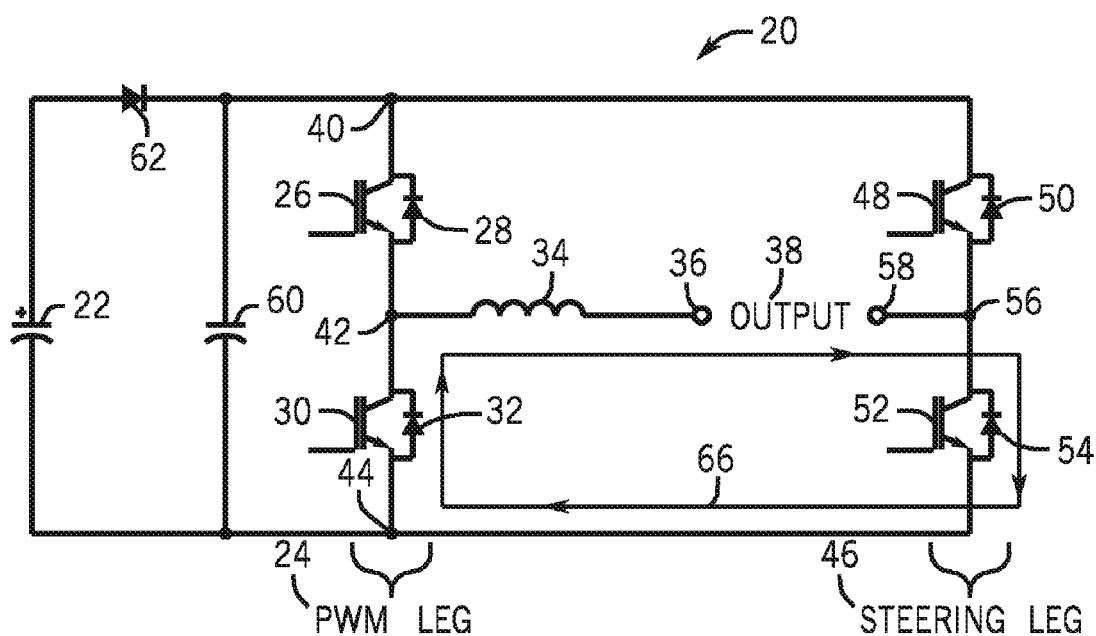
FIG. 4 is a circuit diagram illustrating an exemplary embodiment of the output power control circuit with current flow freewheeling from left to right through the output load in accordance with aspects of the present disclosure.

FIG. 3 is a circuit diagram illustrating an exemplary embodiment of the output power control circuit 20 with a current flow 64 established from left to right through the inductor 34 (i.e. state 1). To establish the left to right current flow 64 through the inductor 34, the fourth transistor 52 is turned on, and the first transistor 26 is pulse width modulated to regulate the magnitude of the current through the inductor 34. The forward path of current 64 originates from the first capacitor 22 and flows through the blocking diode 62, the first node 40, the first transistor 26, the inductor 34, the first terminal 36 of the output 38, the output 38, the second terminal 58 of the output 38, the fourth node 56, the fourth transistor 52, the third node 44 and back to the first capacitor 22. When the pulse width modulation of the first transistor 26 dictates that it is off, a freewheel current path 66, as illustrated in FIG. 4, is established to allow the magnitude of the current flowing through the inductor 34 to decrease (i.e. state 2). The freewheel current path 66 flows from left to right through the inductor 34 and is through the second diode 32, the second node 42, the inductor 34, the first terminal 36 of the output 38, the output 38, the second terminal 58 of the output 38, the fourth node 56, the fourth transistor 52, and the third node 44. The second transistor 30, the first diode 28, the third diode 50, and the third transistor 48 are not used when DC current is flowing from left to right through the inductor 34.

Figure 5:
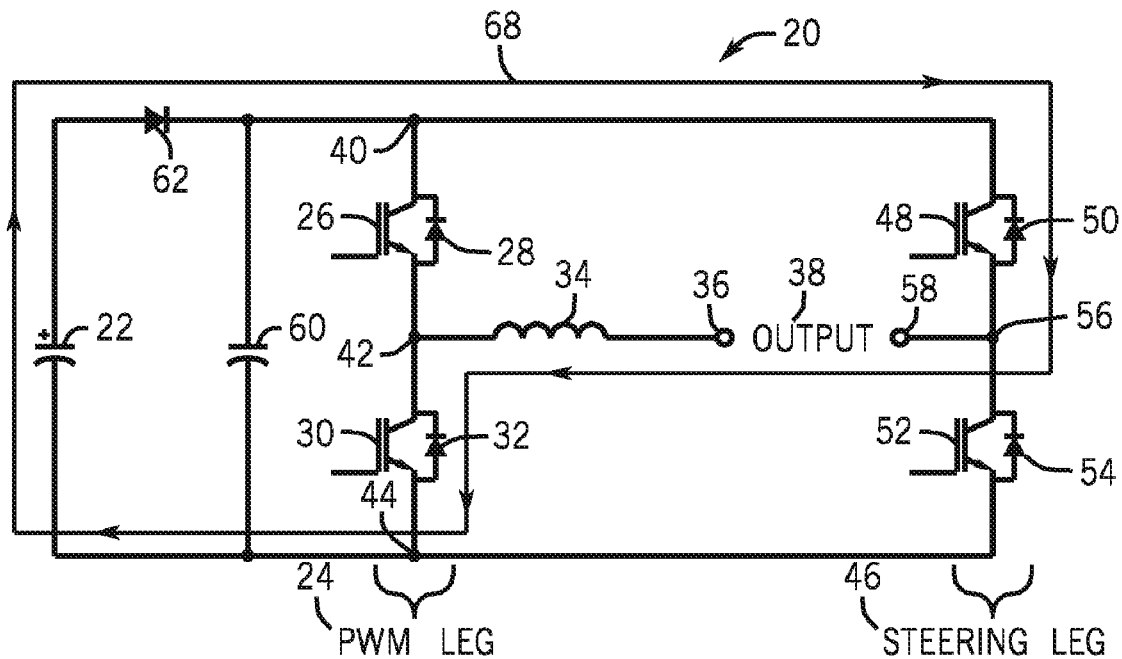
FIG. 5 is a circuit diagram illustrating an exemplary embodiment of the output power control circuit with current flow established from right to left through the output load in accordance with aspects of the present disclosure.
Figure 6:
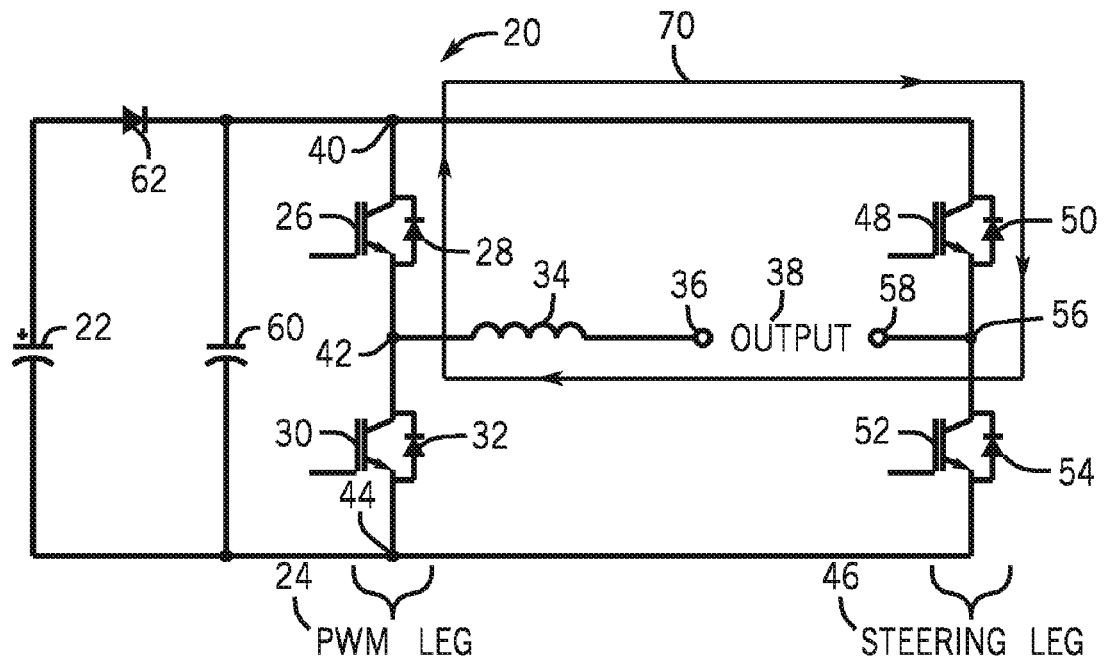
FIG. 6 is a circuit diagram illustrating an exemplary embodiment of the output power control circuit with current flow freewheeling from right to left through the output load in accordance with aspects of the present disclosure.

FIG. 5 is a circuit diagram illustrating an exemplary embodiment of the output power control circuit 20 with a current flow 68 established from right to left through the inductor 34 (i.e. state 5). To establish the right to left current flow 68 through the inductor 34, the third transistor 48 is turned on, and the second transistor 30 is pulse width modulated to regulate the magnitude of the current through the inductor 34. The forward path of current 68 originates from the first capacitor 22 and flows through the blocking diode 62, the first node 40, the third transistor 48, the second terminal 58 of the output 38, the output 38, the first terminal 36 of the output 38, the inductor 34 the second node 42, the second transistor 30, the third node 44 and back to the first capacitor 22. When the pulse width modulation of the second transistor 30 dictates that it is off, a freewheel current path 70, as illustrated in FIG. 6, is established to allow the magnitude of the current flowing through the inductor 34 to decrease (i.e. state 6). The freewheel current path 70 flows from right to left through the inductor 34 and is through the first diode 28, the first node 40, the third transistor 48, the fourth node 56, the second terminal 58 of the output 38, the output 38, the first terminal 36 of the output 38, the inductor 34, and the second node 42. The first transistor 26, the second diode 32, the third diode 50, and the fourth diode 54 are not used when DC current is flowing from right to left through the inductor 34.

Figure 7:
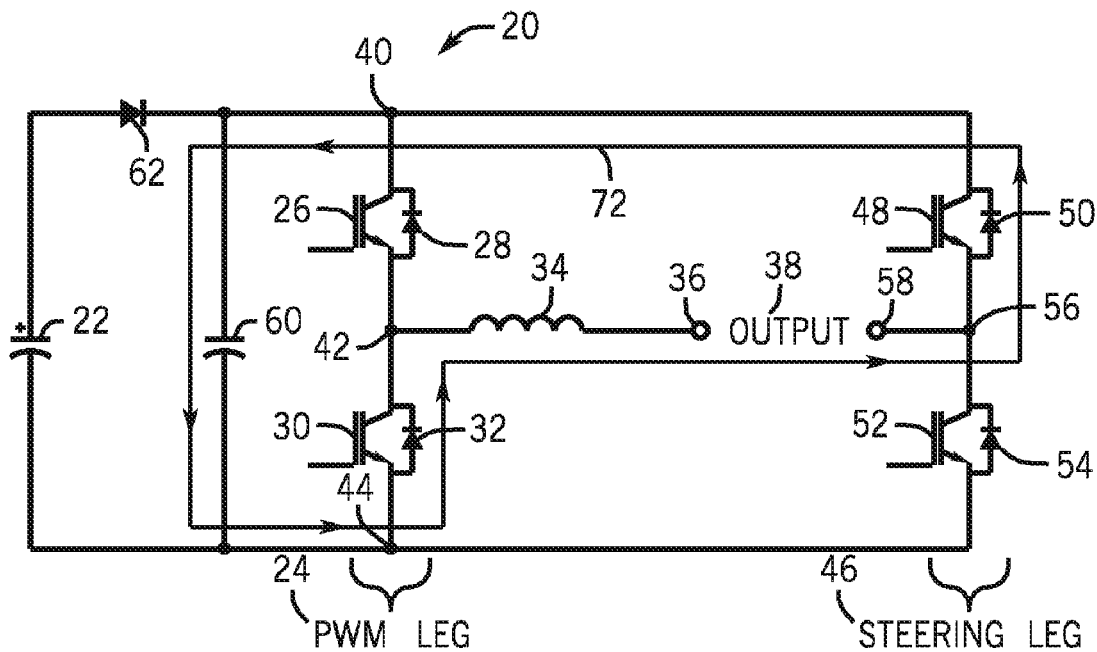
FIG. 7 is a circuit diagram of an exemplary embodiment of the output power control circuit illustrating the first step of current reversal from left to right to right to left through the output load in accordance with aspects of the present disclosure.

In some embodiments, once current flow has been established either in the left to right current path 64 or in the right to left current path 68 through the inductor 34, the direction of the current flow may be reversed. For instance, if current flow has been established in the left to right current path 64 through the inductor 34, the direction of the current flow can be reversed by turning all the transistors 26, 30, 48, 52 off. A first intermediate current flow path 72 illustrated in FIG. 7 is established wherein the current continues to flow from left to right through the inductor 34 (i.e. state 3). The first intermediate current flow path 72 flows from the inductor 34 through the first terminal 36 of the output 38, the output 38, the second terminal of the output 58, the fourth node 56, the third diode 50, the first node 40, the second capacitor 60, the third node 44, the second diode 30, and the second node 42. The inductor 34 releases the energy it stored during the left to right current flow 64, charging the second capacitor 60 to a voltage greater than the voltage of the first capacitor 22, at which point the blocking diode 62 begins to block. The second transistor 30 and the third transistor 48 are turned on to allow the second capacitor to unload its energy back into the output load 38 and the inductor 34 after the current in the inductor 34 reaches zero.

Figure 8:
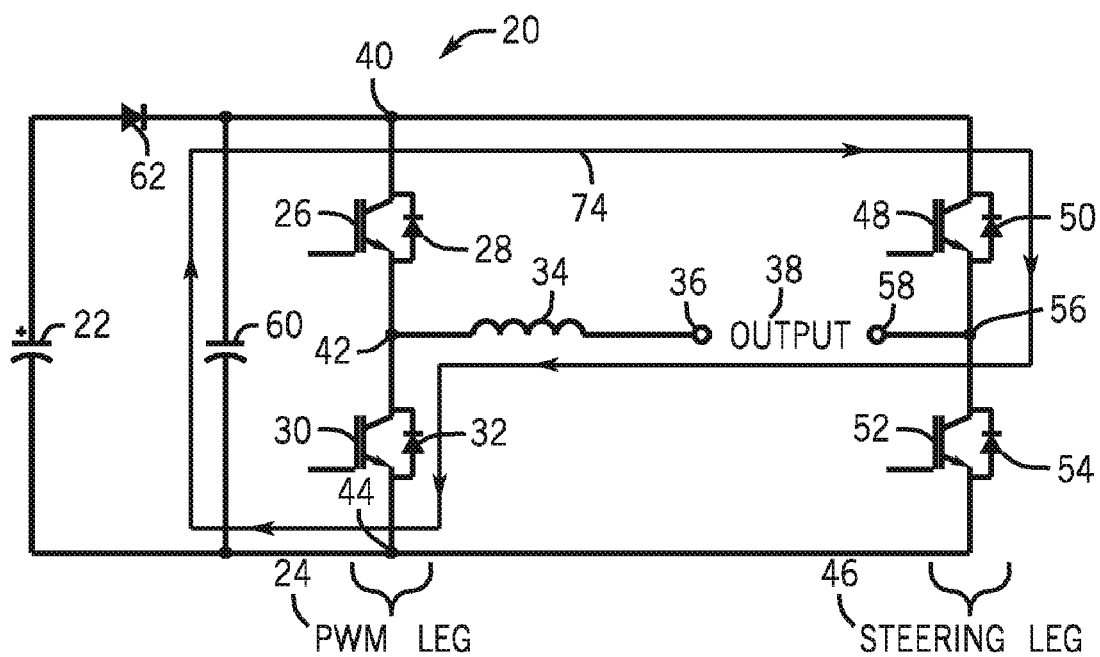
FIG. 8 is a circuit diagram of an exemplary embodiment of the output power control circuit illustrating the second step of current reversal from left to right to right to left through the output load in accordance with aspects of the present disclosure.

When the current in the inductor 34 reaches zero, the voltage on the second capacitor 60 is at an upper limit. Subsequently, the energy built up in the second capacitor 60 will begin to discharge, reversing the direction of the current flow and establishing a current flow path 74 from right to left through the inductor 34, as illustrated in FIG. 8 (i.e. state 4). Since the second transistor 30 and the third transistor 48 have been turned on, current will flow from the second capacitor 60 through the first node 40, the third transistor 48, the fourth node 56, the second terminal of the output 58, the output 38, the first terminal of the output 36, the inductor 34, the second transistor 30, and the third node 44. When the voltage on the second capacitor 60 discharges to the voltage on the first capacitor 22, current flow will be established through the inductor 34 from right to left at approximately the same magnitude as prior to polarity reversal, slightly reduced by circuit losses. Subsequently, the third transistor 48 remains on and the second transistor 30 is pulse width modulated to regulate the current flow through the inductor 34 and reestablish the current path from right to left as previously shown in FIG. 5.

Figure 9:
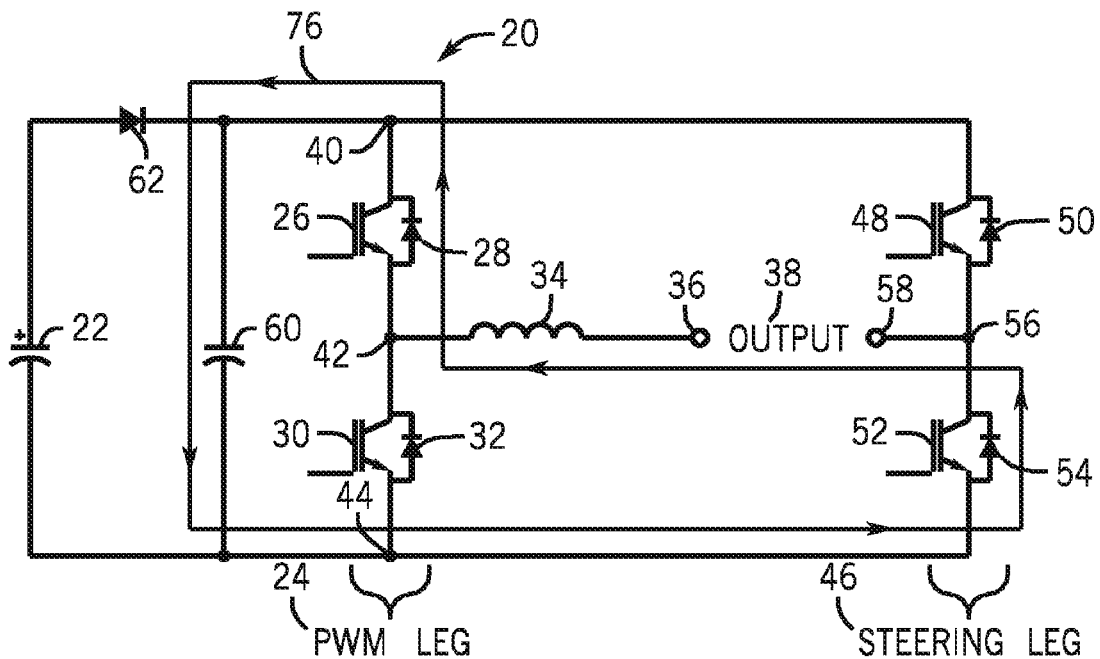
FIG. 9 is a circuit diagram of an exemplary embodiment of the output power control circuit illustrating the first step of current reversal from right to left to left to right through the output load in accordance with aspects of the present disclosure.

Once current flow has been reestablished in the right to left current path 68 through the inductor 34, the direction of the current flow can be reversed by turning all the transistors 26, 30, 48, 52 off. A first intermediate current flow path 76 illustrated in FIG. 9 is established wherein the current continues to flow from right to left through the inductor 34 (i.e. state 7). The first intermediate current flow path 76 flows from the inductor 34 through the second node 42, the first diode 28, the first node 40, the second capacitor 60, the third node 44, the fourth diode 54, the fourth node 56, the second terminal 58 of the output 38, the output 38, and the first terminal of the output 36. The inductor 34 releases the energy it stored during the right to left current flow 68, charging the second capacitor 60 to a voltage greater than the voltage of the first capacitor 22, at which point the blocking diode 62 begins to block. The first transistor 26 and the fourth transistor 52 are turned on to allow the second capacitor to unload its energy back into the output load 38 and the inductor 34 after the current in the inductor 34 reaches zero.

Figure 10:
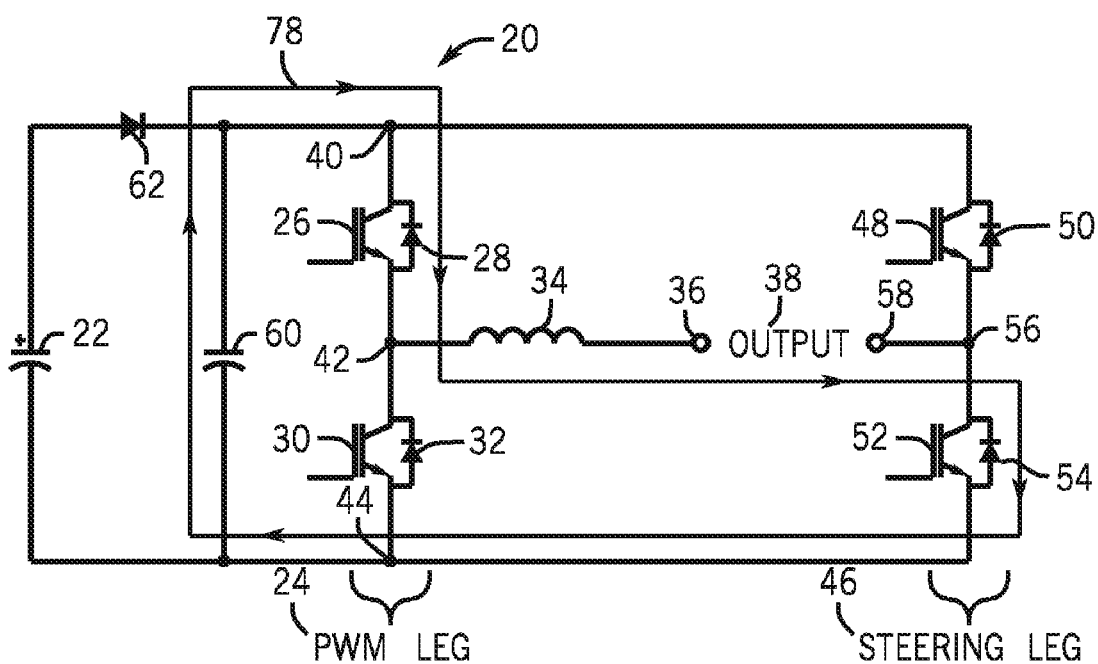
FIG. 10 is a circuit diagram of an exemplary embodiment of the output power control circuit illustrating the second step of current reversal from right to left to left to right through the output load in accordance with aspects of the present disclosure.

When the current in the inductor 34 reaches zero, the voltage on the second capacitor 60 is at an upper limit. Subsequently, the energy built up in the second capacitor 60 will begin to discharge, reversing the direction of the current flow and establishing a current flow path 78 from left to right through the inductor 34, as illustrated in FIG. 10 (i.e. state 8). Since the first transistor 26 and the fourth transistor 52 have been turned on, current will flow from the second capacitor 60 through the first node 40, the first transistor 26, the second node 42, the inductor 34, the first terminal of the output 36, the output 38, the second terminal of the output 58, the fourth node 56, the fourth transistor 52, and the third node 44. When the voltage on the second capacitor 60 discharges to the voltage on the first capacitor 22, current flow will be established through the inductor 34 from left to right at approximately the same magnitude as prior to polarity reversal, slightly reduced by circuit losses. Subsequently, the fourth transistor 52 remains on and the first transistor 26 is pulse width modulated to regulate the current flow through the inductor 34 and reestablish the current path from left to right as previously shown in FIG. 3.

Figure 11A:
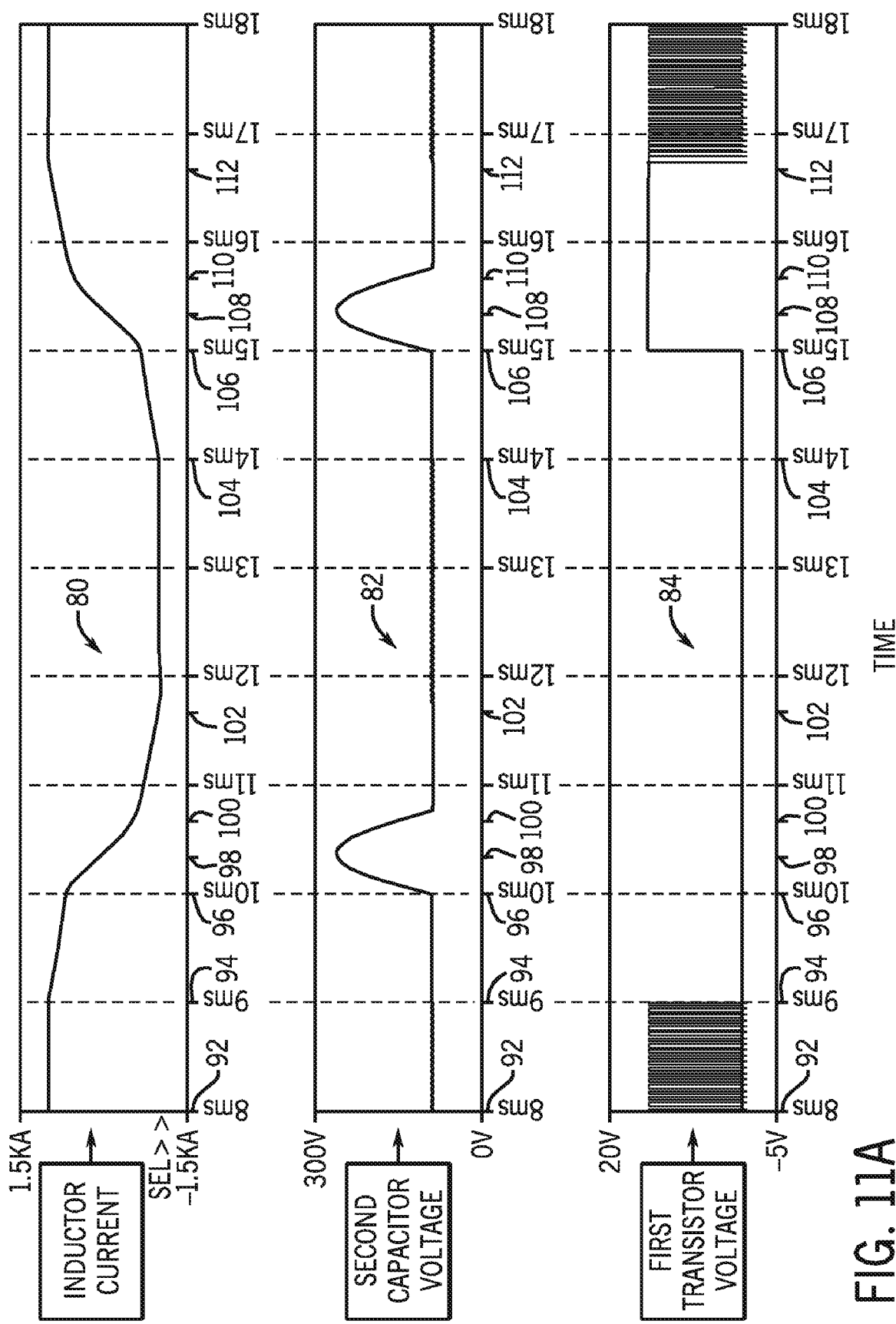
FIGS. 11A and 11B are graphical representations of exemplary waveforms generated during output power control circuit operation.
Figure 11B:
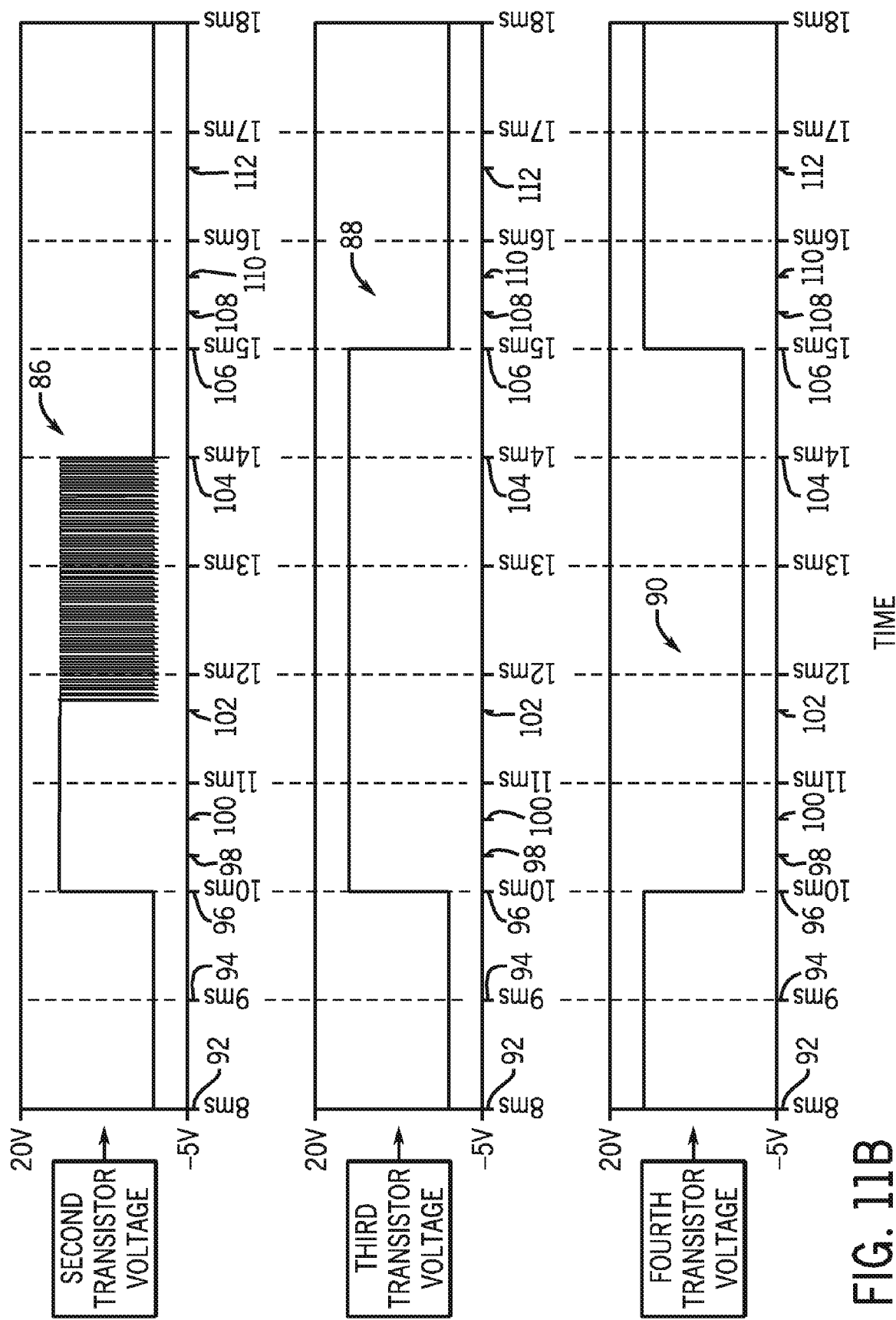

FIGS. 11A and 11B illustrate exemplary current and voltage waveforms generated during control circuit operation. In particular, FIGS. 11A and 11B illustrate an inductor current waveform 80, a second capacitor voltage waveform 82, a first transistor voltage waveform 84, a second transistor voltage waveform 86, a third transistor voltage waveform 88, and a fourth transistor voltage waveform 90. From an initial time 92 to a later time 94, the circuit 20 is switching between state 1 and state 2 to maintain the current at the output 38 at 1000A flowing from left to right through the inductor 34 as previously described with respect to FIGS. 3-4. The fourth transistor 52 is on in both states 1 and 2 while the first transistor 26 is on in state 1 and off in state 2. A current at the output 38 appears to be a constant 1000A but is actually increasing a few amps in state 1 and decreasing a few amps in state 2. From a time 94 to a later time 96, the circuit 20 remains exclusively in state 2, the fourth transistor 52 is the only transistor on, and the current at the output 38 is decreasing.

At the time 96, the fourth transistor 52 is turned off, and the circuit 20 is in state 3 as previously described with respect to FIG. 7. The second transistor 30 and the third transistor 48 are turned on in state 3 even though the current flow path is through the second diode 32 and the third diode 50. During state 3, the current at the output 38 rapidly decreases while the voltage on the second capacitor 60 increases. Subsequently, at a later time 98, the current at the output 38 reverses, and the voltage on the second capacitor 60 is at an upper limit. At the time 98, the circuit 20 enters state 4, as previously described with respect to FIG. 8. The current at the output 38 increases rapidly through the second capacitor 60, the second transistor 30, and the third transistor 48. The voltage on the second capacitor 60 begins to decrease.

Subsequently, at an approximate later time 100, the current at the output 38 has reversed and is flowing from right to left through the inductor 34. The voltage on the second capacitor 60 has reached its initial condition. From the approximate time 100 to an approximate time 102, the circuit 20 is in state 5, as previously described with respect to FIG. 5. The second transistor 30 and the third transistor 48 are on, and the current at the output 38 increases. At the time 102, the current at the output 38 has reached 1000A and is flowing from right to left through the inductor 34. The circuit 20 is switching between states 5 and 6 to maintain the output current at 1000A as previously described with respect to FIGS. 5-6. The second transistor 30 is on in state 5 while the current at the output is increasing a few amps.

From a time 104 to a later time 106, the circuit 20 is in state 6 as previously described with respect to FIG. 6. The third transistor 48 is on, the second transistor 30 is off, and the current at the output is decreasing a few amps. At the time 106, the third transistor 48 turns off, and the circuit is in state 7 as previously described with respect to FIG. 9. The first transistor 26 and the fourth transistor 52 turn on in state 7 even though the current flow is through the first diode 28 and the fourth diode 54. During state 7, the current at the output 38 rapidly decreases, while the voltage on the second capacitor 60 increases. At an approximate later time 108, the current at the output 38 reverses, and the voltage on the second capacitor 60 is at an upper limit. At the time 108, the circuit 20 enters state 8 as previously described with respect to FIG. 10. The current at the output increases rapidly through the second capacitor 60, the first transistor 26, and the fourth transistor 52. The voltage on the second capacitor 60 begins to decrease.

At an approximate time 110, the current at the output 38 has reversed, and current flow is from left to right through the inductor 34 while the voltage on the second capacitor 60 has reached its initial condition. From the approximate time 110 to an approximate time 112, the circuit 20 returns to state 1, wherein the first transistor 26 and the fourth transistor 52 are on, and the current at the output 38 increases. At the approximate time 112, the current at the output 38 has reached 1000A flowing from left to right through the inductor 34, and the circuit 20 is switching between states 1 and 2 to maintain the output current at 1000A. In the illustrated exemplary operation, the above described sequence of states repeats for the next 10 mS cycle (i.e. 100 Hz frequency) of current at the output 38.

Figure 12:
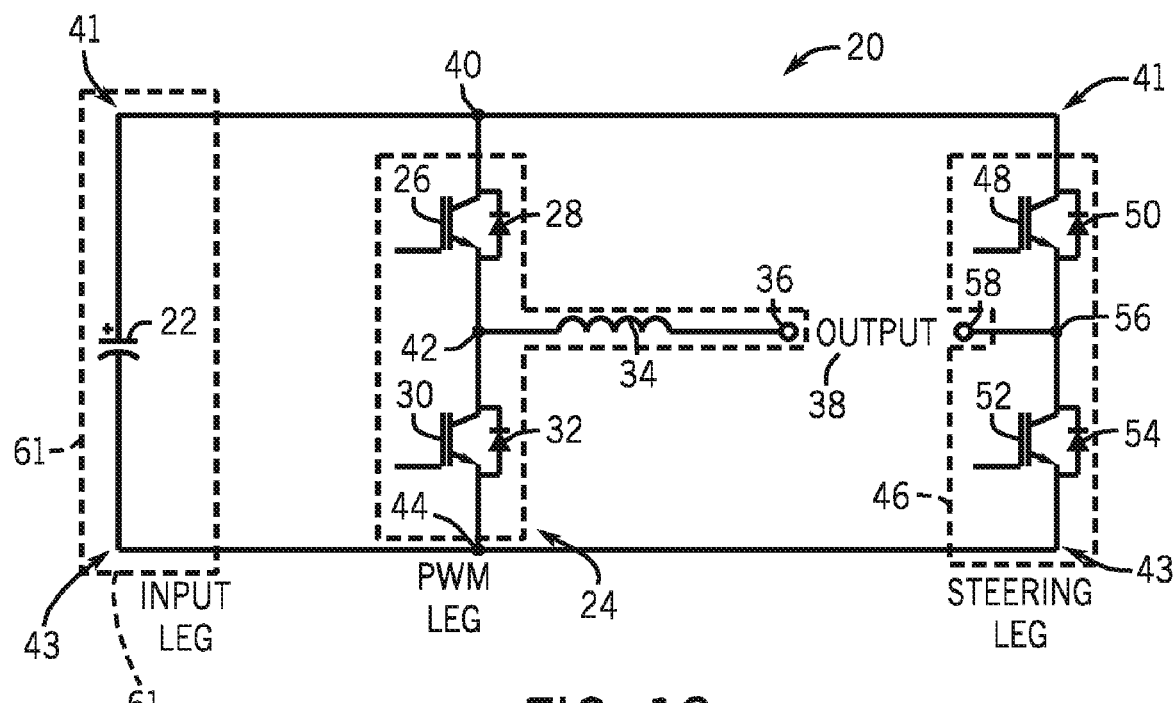
FIG. 12 is a circuit diagram illustrating an exemplary embodiment of the output power control circuit of the welding power supply in accordance with aspects of the present disclosure.

FIG. 12 is a circuit diagram illustrating a further embodiment of the output power control circuit 20 of FIG. 2. It is well known to those skilled in the art that certain welding processes, such as AC GTAW, require a voltage of approximately 200 volts or more during polarity reversal to maintain current flow and prevent arc rectification. Other process, such as AC SAW, may not require this high voltage during polarity reversal, and the embodiment of the output power control circuit 20 illustrated in FIG. 12 may be used. In such processes, the output clamp leg 59, which includes the second capacitor 60 that is configured to function as the output clamp circuit 59 in the embodiment illustrated in FIG. 2, may be eliminated from the output power control circuit 20. Additionally, if the capacitor 60 is eliminated from the output clamp circuit 20, then the blocking diode 62, which was part of the input leg 61 in FIG. 2, is no longer required. Accordingly, in the illustrated embodiment, the output current flows through the capacitor 22 of the input leg 61 during polarity reversal, and the output voltage is clamped to the voltage on capacitor 22.

While only certain features of the present disclosure have been illustrated and described herein, many modifications and changes will occur to those skilled in the art. It is, therefore, to be understood that the appended claims are intended to cover all such modifications and changes as fall within the true spirit of the present disclosure.

The invention claimed is:
1. A welding, cutting, or heating circuit, comprising:
an input leg comprising a first capacitor;
a pulse width modulating leg coupled to the input leg, wherein the pulse width modulating leg is configured to convert direct current (DC) voltage from the first capacitor to current in a parasitic output inductance of a load coupled to the pulse width modulating leg, wherein the pulse width modulation leg is configured to function as a bidirectional buck converter;
a steering leg coupled to the pulse width modulating leg, wherein the steering leg is configured to determine a direction of current flow through an output; and
a blocking diode between the first capacitor and a second capacitor to allow current to flow to the output from the first capacitor in an on configuration and to block current to the first capacitor from the second capacitor in an off configuration.

2. The welding, cutting, or heating circuit of claim 1, wherein the pulse width modulating leg comprises:
 a first transistor and a first diode coupled together in parallel between a first node and a second node;
 a second transistor and a second diode coupled together in parallel between the second node and a third node; and
 an inductor arranged between the first node or the second node and the output.

3. The welding, cutting, or heating circuit of claim 2, wherein the steering leg comprises:
 a third transistor and a third diode coupled together in parallel and a fourth transistor and a fourth diode coupled together in parallel, wherein the third transistor and the third diode are coupled in series with the fourth transistor and the fourth diode.

4. The welding, cutting, or heating circuit of claim 1, comprising an output clamp leg arranged in parallel with the input leg, wherein the output clamp leg is configured to suppress inductance of the welding, cutting, or heating circuit during reversal of current flow through the output.

5. The welding, cutting, or heating circuit of claim 4, wherein the output clamp leg comprises the second capacitor.

6. The welding, cutting, or heating circuit of claim 1, wherein the pulse width modulating leg comprises a pair of transistors and diodes arranged with the parasitic output inductance to pulse width modulate current received from the first capacitor of the input leg.

7. The welding, cutting, or heating circuit of claim 1, wherein the steering leg comprises a pair of transistors and diodes configured to control a direction of current flow through the output.

8. The welding, cutting, or heating circuit of claim 1, wherein the pulse width modulating leg and the steering leg cooperate to function as a DC to AC converter.

9. The welding, cutting, or heating circuit of claim 1, wherein the first capacitor is arranged in parallel with the pulse width modulating leg and the steering leg and is coupled to a primary power input that in operation establishes the DC voltage across the first capacitor.

10. A method of controlling current flow through an output load of a welding, cutting, or heating circuit, comprising:
 pulse width modulating voltage from a first capacitor by switching one of a pair of modulation transistors to provide a level of current through an inductor and an output of the welding, cutting, or heating circuit, wherein the pair of modulation transistors are arranged along a pulse width modulation leg, and the inductor extends from at least one of the pair of modulation transistors to the output of the welding, cutting, or heating circuit, wherein the pulse width modulation leg is configured to function as a bidirectional buck converter;
 controlling a direction of current through the inductor and the output of the welding, cutting, or heating circuit by switching a first of a pair of steering transistors to an on configuration such that the current passes through the first of the pair of steering transistors in the on configuration and returns to the first capacitor; and
 reversing the direction of the current through the inductor in an off configuration to return current to a second capacitor, and blocking the current to the first inductor via a blocking diode.

11. The method of claim 10, comprising freewheeling current through a steering transistor of the pair of steering transistors in the on configuration, a diode in parallel with the one of the pair of modulation transistors that is not switching, the inductor, and the output of the welding, cutting, or heating circuit during an off period of pulse width modulating.

12. The method of claim 10, comprising initiating reversal of the direction of the current through the inductor and the output of the welding, cutting, or heating circuit by turning off each of the pair of modulation transistors and turning off each of the pair of steering transistors to allow energy to drain from the inductor to the first capacitor via a first diode arranged in parallel with a second modulation transistor of the pair of modulation transistors and a second diode arranged in parallel with a second steering transistor of the pair of steering transistors.

13. The method of claim 12, comprising reversing the direction of the current through the inductor and the output of the welding, cutting, or heating circuit by turning on the second modulation transistor and turning on the second steering transistor to allow the first capacitor to discharge built up energy to the inductor.

14. The method of claim 13, wherein voltage at the output is clamped to a voltage on the first capacitor when reversing the direction of the current through the inductor and the output of the welding, cutting, or heating circuit.

15. A welding, cutting, or heating circuit, comprising:
 an input leg comprising a first capacitor;
 a pulse width modulating leg coupled to the input leg, wherein the pulse width modulating leg is configured to convert direct current (DC) voltage from the first capacitor to current in a parasitic output inductance of a load coupled to the pulse width modulating leg via a pair of pulse width modulating transistors;
 a steering leg coupled to the pulse width modulating leg, wherein the steering leg is configured to determine a direction of current flow through an output via a pair of steering transistors, the output arranged between the pulse width modulating leg and the steering leg;
 an output clamp leg comprising a second capacitor, such that peak current in the second capacitor during polarity reversal matches a current in the inductor or the parasitic output inductance of the welding or cutting cables; and
 a blocking diode arranged between the first and second capacitors, the blocking diode to allow current originating at the first capacitor to flow to the second capacitor at a first polarity.

16. The welding, cutting, or heating device of claim 15, comprising an inductor coupled between at least one of the pair of pulse width modulating transistors and the output.

17. The welding, cutting, or heating device of claim 15, wherein a first diode is coupled in parallel with a first pulse width modulating transistor of the pair of pulse width modulating transistors, a second diode is coupled in parallel with a second pulse width modulating transistor of the pair of pulse width modulating transistors, a third diode is coupled in parallel with a first steering transistor of the pair of steering transistors, and a fourth diode is coupled in parallel with a second steering transistor of the pair of steering transistors.

18. The welding, cutting, or heating device of claim 16, wherein the second capacitor and the output clamp leg are configured to function as an output clamp circuit to suppress energy in the parasitic output inductance during polarity reversal to a second polarity.

19. The welding, cutting, or heating device of claim 15, wherein the blocking diode is coupled in series with the first capacitor and arranged between the first capacitor and the pulse width modulating leg.

20. The welding, cutting, or heating device of claim 15, wherein the pulse width modulating leg is configured for a greater switching frequency than the steering leg.

* * * * *